United States Patent [19]

Meitner et al.

[11] 4,443,513

[45] Apr. 17, 1984

[54] SOFT THERMOPLASTIC FIBER WEBS AND METHOD OF MAKING

[75] Inventors: Gary H. Meitner, Winnebago County, Wis.; Patrick J. Notheis, Cobb County, Ga.

[73] Assignee: Kimberly-Clark Corporation, Neenah, Wis.

[21] Appl. No.: 351,829

[22] Filed: Feb. 24, 1982

[51] Int. Cl.³ .................................................. B32B 3/00
[52] U.S. Cl. ...................... 422/195; 264/222.2; 264/229.6; 422/171; 422/224; 422/227; 422/228; 422/296; 422/297; 422/298; 422/303; 422/903; 422/910
[58] Field of Search ............... 428/195, 198, 284, 287, 428/288, 296, 297, 298, 303, 903, 156, 171, 910; 264/288.8, 289.6

[56] References Cited

U.S. PATENT DOCUMENTS

| | | | |
|---|---|---|---|
| 3,772,417 | 11/1973 | Vogt | 264/115 |
| 3,795,571 | 3/1974 | Prentice | 428/198 |
| 3,949,127 | 4/1976 | Ostermeur et al. | 428/198 |
| 3,978,185 | 8/1976 | Bunten et al. | 264/121 |
| 4,041,203 | 8/1977 | Brock et al. | 428/296 |
| 4,048,364 | 9/1977 | Harding et al. | 428/198 |
| 4,107,364 | 8/1978 | Sisson | 428/296 |
| 4,187,343 | 2/1980 | Akiyama et al. | 264/288.8 |
| 4,223,059 | 9/1980 | Schwarz | 428/198 |
| 4,276,336 | 6/1981 | Sabee | 428/132 |
| 4,307,143 | 12/1981 | Meitner | 428/198 |
| 4,324,752 | 4/1982 | Newton et al. | 264/288.8 |

*Primary Examiner*—James J. Bell
*Attorney, Agent, or Firm*—William D. Herrick; R. Jonathan Peters; Howard Olevsky

[57] ABSTRACT

A soft nonwoven web of entangled fibers or filaments having a pattern of fused bond areas and a stretched, loopy filament configuration outside of the patterned bond areas. The result is a soft web with high bulk that retains to a high degree the original bonded strength properties. In one embodiment, product may be obtained by pattern bonding a meltblown microfiber web under conditions of heat and pressure and then stretching the web under controlled conditions up to preferably about 140% of its original dimension in at least one direction. When relaxed, the stretched filaments bulk and loop except in the fused bond areas where they retain bonding properties. Preferred stretching conditions include room temperature and the use of draw rolls at speed differentials producing the desired stretch. Examples of thermoplastics polymers useful in accordance with the invention include polypropylene, polyethylene, polyesters and polyamides, as well as copolymers and polymer blends. Laminates of these nonwoven webs may also be treated. Uses for the material of the invention include any of those nonwoven fabric applications where softness and bulk are desired attributes such as, for example, wipers, garments, surgical drapes, and the like.

20 Claims, 10 Drawing Figures

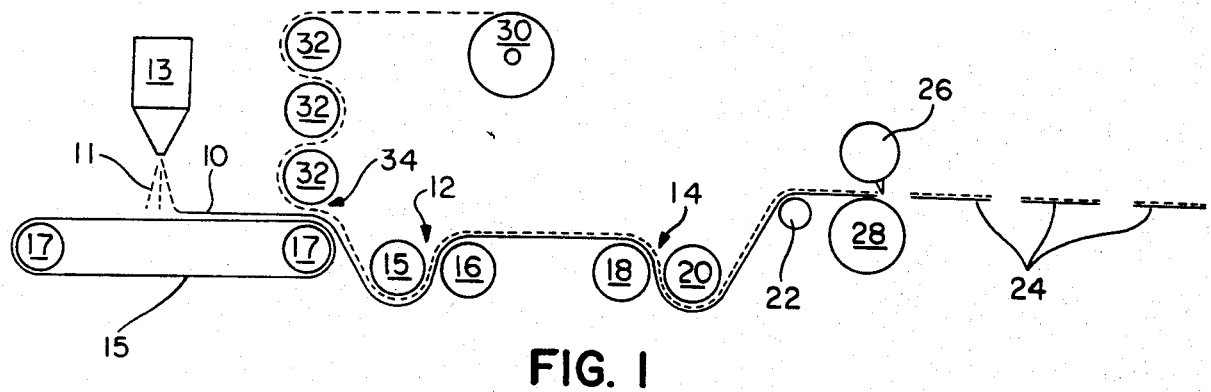
FIG. 1
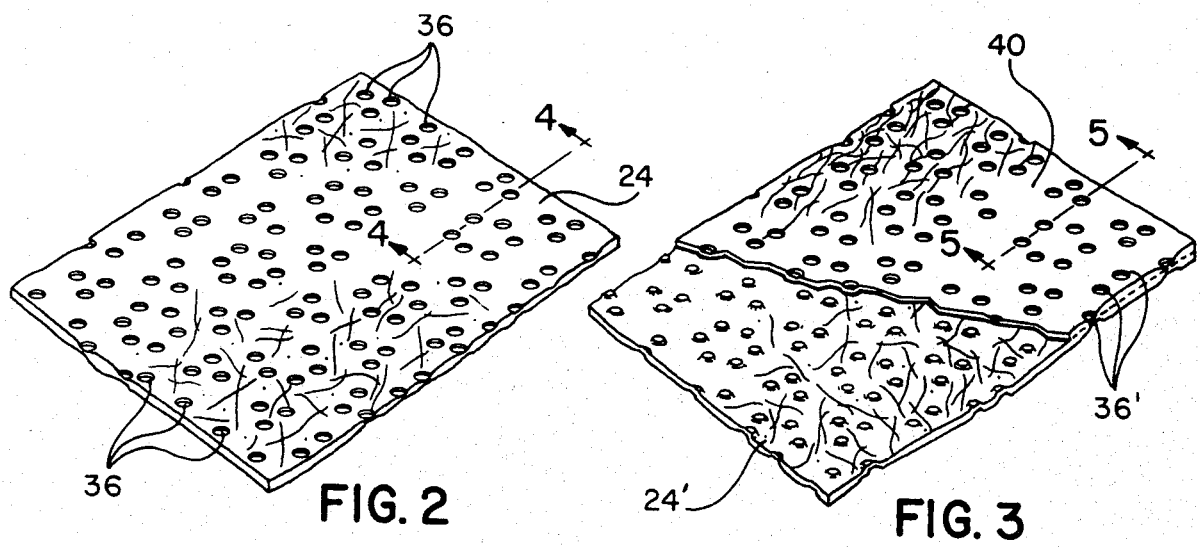
FIG. 2
FIG. 3
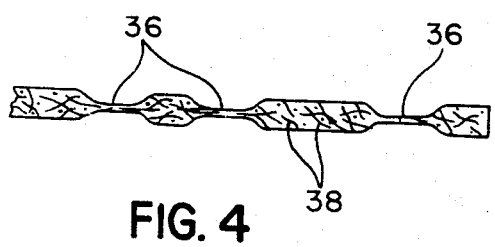
FIG. 4
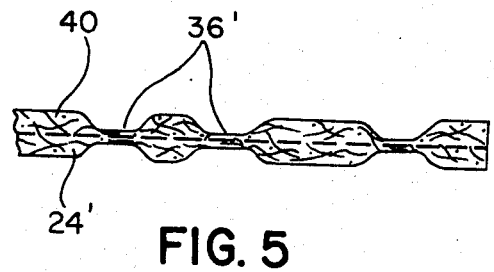
FIG. 5

SOFT THERMOPLASTIC FIBER WEBS AND METHOD OF MAKING

BACKGROUND OF THE INVENTION

1. Field of the Invention

This invention pertains to the field of nonwoven fabrics and the manufacture thereof. More specifically, it relates to such nonwoven fabrics that are comprised of one or more component layers of staple length or longer fibers or continuous filaments, for example, fabrics of microfibers having an average diameter in the range of up to about 10 microns. These microfiber webs have high capillarity and find many uses in absorbing oily materials such as, for example, industrial wipers, oil spill clean-up materials, and the like. When treated for wettability, these materials may also be used for absorbing aqueous liquids in applications such as institutional food service wipes and the like.

In such applications as well as in many others such as in garment and protective covers, these materials have found acceptance. However, for some purposes a high degree of conformability and softness is desired to avoid a papery feel and improve properties for wiping purposes, for example. The present invention relates to improvements in these and other properties and nonwoven materials incorporating such improvements as well as the methods for achieving them.

2. Description of the Prior Art

Thermoplastic nonwoven webs are well-known and have been produced by a number of processes including fibrillation, melt and solution spinning, and the like. One method that has achieved commercial acceptance is a meltblowing process developed by the Naval Research Laboratories which is described, for example, in Wendt, *Industrial and Engineering Chemistry* Volume 48, No. 8 (1965) pages 1342 through 1346. This process has been further developed by others and improvements are described in, for example, U.S. Pat. No. 3,978,185 to Buntin et al issued Aug. 31, 1976, U.S. Pat. No. 3,795,571 to Prentice issued Mar. 5, 1974, and U.S. Pat. No. 3,811,957 to Buntin issued May 21, 1974. The Buntin et al patent further discloses that mats of meltblown polyolefins are useful as wiping cloths and as hydrocarbon absorption material.

In general, such meltblown materials lack adequate strength for many applications. Accordingly, various steps have been investigated to increase strength properties of these webs. Including among these is the step of spot bonding by patterned adhesive application or by means of heat and pressure which is described, for example, in co-pending U.S. Pat. No. 4,307,143 to Meitner entitled "Microfiber Oil and Water Wipe," issued Dec. 22, 1981. While improving strength properties, such spot bonding also increases stiffness and decreases bulk, both of which results are undesirable for many applications. Therefore, a need exists for thermoplastic fiber webs of improved softness, conformability and bulk while yet retaining at least to a high degree strength properties attributable to pattern bonding as well as other desired properties depending upon the intended application.

Stretching of nonwoven webs to improve strength properties is also known and described in the patent literature. For example, U.S. Pat. No. 3,772,417 to Vogt issued Nov. 13, 1973 describes such a process where thermally bonded nonwovens are stretched in the presence of heat in a two step process to give a total stretch that increases the area independent of the direction of stretch up to about 15 to 16 times or more. Drawing of meltblown microfiber webs is also described in U.S. Pat. No. 4,048,364 to Harding et al issued Sept. 13, 1977. As with the previously described Vogt patent, the purpose is to increase strength properties and the draw ratios are used from about 2 to 1 to about 10 to 1 under heated conditions, resulting in a ribbon useful, for example, in constructing a scrim support. U.S. Pat. No. 4,223,059 to Schwarz issued Sept. 16, 1980, discloses a process and apparatus for selectively stretching nonwovens. Other patents relating, in general, to stretching of nonwovens include U.S. Pat. No. 3,949,127 to Ostermeier et al issued Apr. 6, 1976 and U.S. Pat. No. 4,276,336 to Sabee issued June 30, 1981.

SUMMARY OF THE INVENTION

The present invention provides a nonwoven web of thermoplastic fibers or filaments having improved softness, bulk, and drapability while yet retaining to a high degree strength properties of patterned fused bonds. In accordance with the process of the present invention the improved results are obtained by stretching under controlled conditions a pattern bonded web such as is described in previously identified Meitner U.S. Pat. No. 4,307,143. The controlled stretching takes place under cool or room temperature conditions and is limited to an increase in overal dimension in the direction being stretched up to the elongation required to break, in most cases up to about 1.2 to 1.4 times. Within this limited stretch application, the filaments are stretched between the bond areas while maintaining the fused bonded conditions in the pattern of bonds. When relaxed, the web retracts toward its original dimensions, but the stretched filaments between the bond areas are caused to loop outwardly resulting in a desired increase in bulk and softness. In addition, a surprising improvement in absorbency properties is obtained which is especially important for wipe applications. However, because the bond patterned areas are not substantially disrupted, the web retains to a high degree its original bonded strength properties. In addition, shrinkage is minimized and the overall web area increased in spite of the rise in bulk.

Such improved nonwoven materials may be formed from single webs or laminates and are especially useful as wipers, garments, and for other application where softness, bulk and drapability are desirable attributes.

BRIEF DESCRIPTION OF THE DRAWINGS

FIG. 1 is a schematic illustration of apparatus which may be used to stretch the web in accordance with the invention;

FIGS. 2 and 3 are plan views of a bulky, soft web in accordance with the invention;

FIGS. 4 and 5 are cross sections of the webs of FIGS. 2 and 3, respectively, along lines 4—4 and 5—5;

DESCRIPTION OF THE PREFERRED EMBODIMENTS

Figure 6:
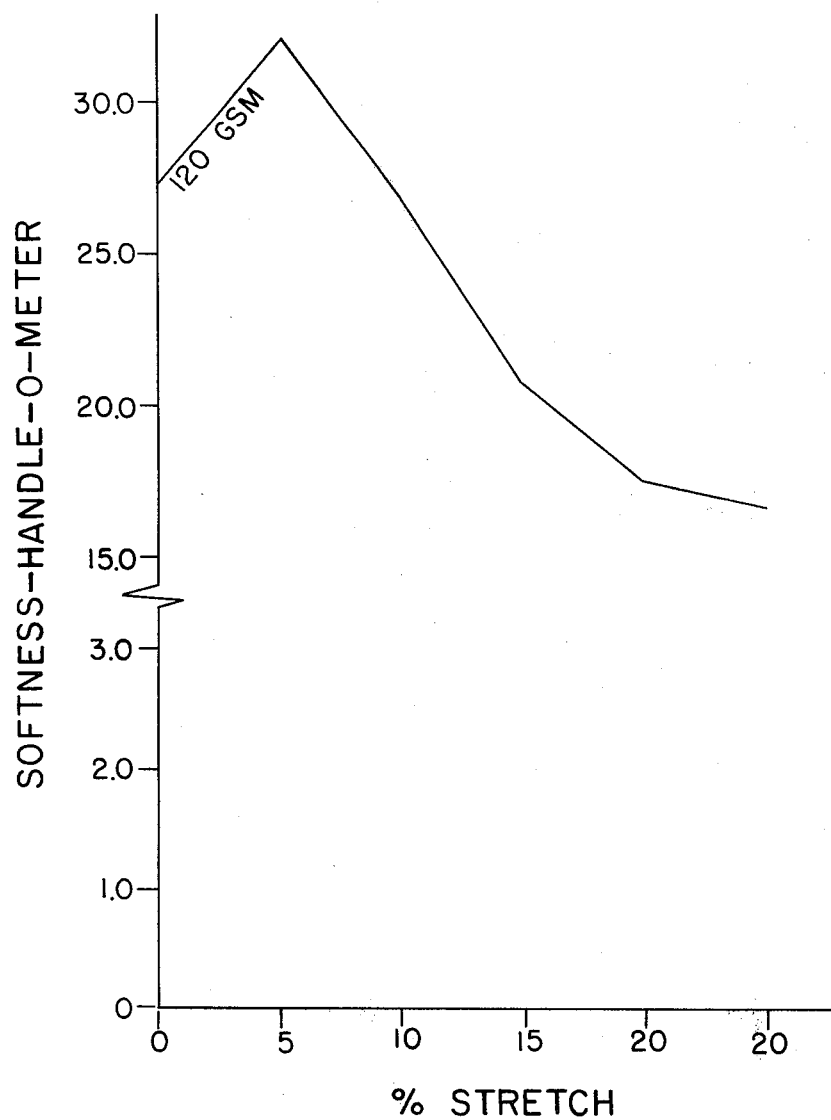
FIG. 6 is a graph illustrating improvements in drape obtained in accordance with the invention.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

In illustration of the results obtained in accordance with the invention certain tests were performed. These tests are described as follows:

Softness (drape stiffness)—Method 5206.1 (Jan. 15, 1969) published as Federal Method Test Standards 191 B in CCC-T-191b employing the principle of cantilever bending of the fabric under its own weight. A 6 inch by 1 inch strip of fabric was slid in a direction parallel to its long dimension over the edge of a horizontal surface. The length of overhang was measured when the tip of the material was depressed under its own weight to an angle of $41\frac{1}{2}°$ with horizontal. One-half this length is the drape stiffness (bending length) of the specimen.

Bulk—An Ames thickness tester Model 3223 equipped with a long range dial indicator, 0–100 dial units with 0.001 inch graduation and 3 inches full span was used. A platen with total weight of 0.4 lb. including attachment rod and weights was placed on a 4 inch by 4 inch sample and the bulk read to the nearest 0.001 inch 15–20 seconds thereafter.

Effective Capacity—A sample 7 inches by 11 inches was cut and weighed to the nearest 0.01 g. (weight #1). After soaking for 1 minute in the liquid under consideration the sample was removed and allowed to drip for 1 minute, then reweighed (weight #2). Using an Atlas Laboratory wringer with 50 lbs. force, the sample was wrung out and reweighed (weight #3). The sample was resoaked for 1 minute, allowed to drip 1 minute and reweighed (weight #4). From these steps, three calculations were made:

$$\% \text{ Capacity} = \frac{\text{Weight \#2} - \text{Weight \#1}}{\text{Weight \#1}} \times 100$$

$$\% \text{ Effective Capacity} = \frac{\text{Weight \#2} - \text{Weight \#3}}{\text{Weight \#1}} \times 100$$

$$\frac{\% \text{ Resaturated}}{\text{Effective Capacity}} = \frac{\text{Weight \#4} - \text{Weight \#3}}{\text{Weight \#1}} \times 100$$

Grab Tensile—Tensile results were obtained essentially in accordance with ASTM D-1117-74. Samples 4 inches by 6 inches were prepared with 5 each having its length in the "machine" and "cross" directions. An Instron machine was used having one jaw face 1 inch square and the other 1 inch by 2 inches or larger with the longer dimension perpendicular to the direction of load. At a crosshead speed of 12 inches per minute, the full scale load was recorded and multiplied by a factor as follows: Readings (lbs.): 2, 5, 10, 20, 50; factors (respectively): 0.0048, 0.012, 0.024, 0.048, 0.120. The results were reported in energy (inches/lbs.).

Capillary Sorption—Capillary sorption pressure results were obtained essentially as described in Burgeni and Kapur, "Capillary Sorption Equilibria in Fiber Masses," *Textile Research Journal,* May 1967, pp.356–366. A filter funnel was movably attached to a calibrated vertical post. The funnel was movable and connected to about 8 inches of capillary glass tubing held in a vertical position. A flat, ground 150 ml. Buchner form fitted glass medium Pyrex filter disc having a maximum pore diameter in the range of 10–15 microns supported the weighed sample within the funnel. The funnel was filled with Blandol white mineral oil having a specific gravity in the range of 0.845 to 0.860 at 60° F. from Whitco Chemical, Sonneborn Division, the sample weighed and placed under 0 psi pressure on the filter. After one hour during which the meniscus was maintained constant at a given height starting at 35 cm., the sample was removed, weighed, and grams per gram absorbed calculated. The height was adjusted and the process repeated with a new sample until a height of 1 cm. was reached. The results were plotted as in FIG. 8. In general, results obtained below 20 cm oil indicate oil contained within large voids which do not contribute significantly to clean wiping performance. Results obtained above 20 cm. oil are most significant as representing oil absorbed within the fibers which will be retained and cause the material to wipe cleanly.

Trapezoidal Tear—Trapezoidal tear results were obtained essentially in accordance with ASTM D2263 #34, page 483, part 24, ASTM Test Methods. An Instron tester was used equipped with a 1 inch by 3 inch jaw grip with the longer dimension perpendicular to the direction of load application. A trapezoidal template was used having parallel sides 1 inch and 4 inches long with a 3 inch height and a 15 mm cut in the 1 inch side. Five 3 inch by 6 inch samples were prepared with a tear in the "machine" direction and five with a tear in the "cross" or opposite direction. The tear was made by cutting as in the template. The Instron load range was selected such that the break will normally occur between 10% and 90% of full scale load, and the sample was clamped along nonparallel sides with the cut midway between. The crosshead was moved until the sample ruptured or the return limit was reached. The maximum and minimum tearing loads were reported for each sample group of five, and the average reported as the tearing load.

EXAMPLES

EXAMPLE 1

A meltblown thermoplastic microfiber web was produced having a basis weight of 85 g/m$^2$ in accordance with the procedures described in the above referenced Meitner U.S. Pat. No. 4,307,143. This web was produced by meltblowing polypropylene through a die having a row of apertures and impinging heated air at the die exit to draw the filaments forming microfibers which were quenched and collected on a moving wire. The web was pattern bonded under heat and pressure conditions of 220° F. and 200 lbs/lineal inch with 16 inch diameter rolls in a pattern as illustrated in U.S. Pat. No. De. 239,566 to Vogt issued Apr. 13, 1976 having 117 pins per square inch with bond area percentage of 15.2%.

This web was then stretched using apparatus schematically illustrated in FIG. 1. Thus, web 10 formed, for example, by spinning filaments 11 from extruder 13 onto carrier 15 driven about rolls 17 was fed through nip 12 between rubber blanketed rolls 15 and 16 and then through nip 14 of rubber blanketed rolls 18 and 20 after which it may be fed over guide roll 22 and cut into desired segments 24 by knife roll 26 and anvil roll 28 or collected on a reel (not shown). For treatment of laminates, as shown in phantom lines, additional web 30 may be unwound and fed over guide rolls 32 and combined with web 10 at nip 34.

For this example, nip 14 was operated under conditions to produce varying degrees of stretch of 15, 18, 20, and 21 percent. As will be recognized by those skilled in the art, the stretching may take place either as an in-line step in the nonwoven manufacturing process or as a separate operation. It is preferred, however, to stretch separately as a converting step to avoid the need for rewinding and compressing the material. The resulting stretched webs were tested for grab tensile, water capacity, and softness, and the results are reported in Table I.

TABLE I

| Ex. | % Stretch | % Decrease Grab Tensile | % Gain Water Capacity | % Increase-Softness (Drape-Stiffness) MD | CD |
|---|---|---|---|---|---|
| 1A | 15 | 3 | 5.5 | 20 | 14 |
| 1B | 18 | 9 | 12.4 | 18 | 26 |
| 1C | 20 | 11 | 20 | 23 | 27 |
| 1D | 21 | 11.5 | 22.5 | 26 | 27 |

EXAMPLE 2

The web of Example 1 was subjected to stretching 17, 19, 19.4 and 20 percent, and loss of width-wise dimension measured. The result was a loss of 5%, 3%, 5.5%, and 6.0% respectively. The loss of basis weight was only in the range of 1 to 2% in spite of the increased lineal yardage of 3 to 4%. In other cases widthwise loss may be further reduced or eliminated entirely by the use, for example, of tension control devices or spreader rolls.

EXAMPLE 3

For comparison with Example 5, samples of materials obtained by addition of 60% of cellulose fibers to the meltblown web during formation were combined with 15 g/m² basis weight spunbonded webs and stretched using an Instron universal testing instrument to 3%, 6%, 9% and 12% for a 160 grams/square meter material. Testing for bulk increase for this material resulted in only an increase of 0.02 inch or 3.18%.

EXAMPLE 4

Example 3 was repeated without the spunbonded material except that staple polyester fibers were added in a 50—50 ratio amount in place of the cellulose fibers and the stretching was for 5%, 10%, 15%, and 20% which demonstrated an increase in bulk of only 0.001 inch or 2.50%.

EXAMPLE 5

Using the same test on meltblown microfiber webs of a basis weight of 85 g/m² and produced as in Example 1, resulted in an increase in bulk of 0.0085 inch or 39.5%.

EXAMPLES 6–8

To demonstrate that the present invention produces results that approach those obtained by washing the web material in accordance with AATCC Procedure 34, including 1 cycle in a standard Kenmore washing machine, a much more complicated and expensive procedure, a 120 g/m² meltblown pattern bonded web was treated by washing and by stretching with results in Table II.

TABLE II

| Example | Grab Tensile (g/cm) MD | CD | Elongation (%) MD | CD | Energy (dyne-cm × 10⁵) MD | CD | Trap Tear (g) MD | CD | Drape Flex (cm) MD | CD | Bulk (mm.) |
|---|---|---|---|---|---|---|---|---|---|---|---|
| 6. Unstretched Unwashed | 830 | 725 | 45.80 | 58.54 | 174 | 175 | 1290 | 1250 | 7.42 | 6.60 | 0.84 |
| 7. Unstretched Washed | 743 | 703 | 49.57 | 62.92 | 133 | 153 | 1120 | 900 | 3.99 | 3.94 | 1.37 |
| 8. 20% Stretch Washed | 650 | 525 | 39.36 | 63.32 | 74.8 | 106 | 980 | 1130 | 3.76 | 3.51 | 1.30 |

When compared with Example 5, it can be seen that the present invention produces softness and bulk comparable to that obtained by washing and, in addition, enhances the effects of washing.

EXAMPLES 9–14

To demonstrate that the present invention is also effective with spunbonded nonwoven webs and laminates, the following examples were carried out using pattern bonded spunbonded webs as described, for example in U.S. Pat. No. 4,041,203 to Brock et al issued Aug. 9, 1977 and available under the registered trademark EVOLUTION ® from Kimberly-Clark Corporation alone and as a laminate with previously described pattern bonded meltdown webs:

TABLE III

| Example | Grab Tensile (g/cm) MD | CD | Elongation (%) MD | CD | Energy (dyne-cm × 10⁵) MD | CD | Trap Tear (g) MD | CD | Drape Flex (cm) MD | CD | Bulk (mm.) |
|---|---|---|---|---|---|---|---|---|---|---|---|
| 9. 68 g/m² Spunbonded Polypropylene Unstretched Unwashed | 1210 | 1483 | 39.12 | 38.88 | 218 | 260 | 2830 | 3400 | 7.49 | 7.92 | 0.36 |
| 10. 68 g/m² Spunbonded Polypropylene Unstretched Washed | 1095 | 1193 | 36.94 | 36.87 | 168 | 171 | 3050 | 2930 | 5.28 | 4.83 | 0.53 |
| 11. 68 g/m² | 863 | 1115 | 37.32 | 37.94 | 120 | 164 | 1980 | 2510 | 5.54 | 5.33 | 0.61 |

TABLE III-continued

| Example | Grab Tensile (g/cm) MD | CD | Elongation (%) MD | CD | Energy (dyne-cm × 10⁵) MD | CD | Trap Tear (g) MD | CD | Drape Flex (cm) MD | CD | Bulk (mm.) |
|---|---|---|---|---|---|---|---|---|---|---|---|
| Spunbonded Polypropylene 20% Stretch Washed | | | | | | | | | | | |
| 12. 34 g/m² Meltblown Polypropylene Webs on Both Sides of 25.5 g/m² Spunbonded polypropylene Web Unstretched Unwashed | 1393 | 1465 | 43.71 | 49.76 | 280 | 329 | 3390 | 4170 | 8.41 | 7.72 | 0.53 |
| 13. 34 g/m² Spunbonded Polypropylene on Both Sides of 25.5 g/m² Meltblown Polypropylene Unstretched Washed | 1185 | 1283 | 43.74 | 49.22 | 199 | 251 | 3510 | 3630 | 4.52 | 4.50 | 0.89 |
| 14. 34 g/m² Spunbonded Polypropylene on Both Sides of 25.5 g/m² Meltblown Polypropylene Stretched 20% Washed | 1083 | 1155 | 40.35 | 52.64 | 163 | 235 | 2810 | 3430 | 4.32 | 4.19 | 0.94 |

Lamination was achieved by hot calendar, 320° F. and 800 pli steel on steel, pattern as in Example 1, 24 inch diameter rolls. As shown, the beneficial effects are obtained with spunbonded nonwovens as well as with laminates.

EXAMPLES 15-21

The following examples illustrate additional parameters and embodiments useful in accordance with the present invention. Samples were prepared as in Example 1 except that Examples 15C and 18B were produced using two passes through the stretching mechanism. All stretched samples were prepared with a 12 inch ratch or distance between draw rolls, and all samples were prepared with light brake tension except 21A which had no tension.

TABLE IV

| Example | | 15.2 % Stretch | Grab Tensile (g/cm) MD | CD | Elongation (%) MD | CD | Energy (dyne-cm × 10⁵) MD | CD | Trap Tear (g) MD | CD | Drape Flex (cm) MD | CD | Bulk (mm.) |
|---|---|---|---|---|---|---|---|---|---|---|---|---|---|
| 120 g/m² Meltblown Polypropylene - Bond pattern as in U.S. Design Patent 239,566 | 15A | 20 | 705 | 585 | 33.07 | 68.35 | 88.5 | 143 | 1340 | 990 | 5.77 | 4.83 | 1.05 |
| | 15B | 20 | 805 | 635 | 42.84 | 58.07 | 148 | 143 | 1210 | 1240 | 6.22 | 5.64 | 0.92 |
| | 15C | 20 | 743 | 625 | 36.76 | 63.11 | 114 | 147 | 1190 | 1140 | 6.15 | 5.03 | 0.97 |
| | 15D | 40 | 665 | 583 | 30.19 | 72.18 | 75.7 | 150 | 1180 | 1060 | 5.69 | 4.88 | 1.01 |
| | 15E | 0 | 830 | 725 | 45.80 | 58.54 | 174 | 175 | 1290 | 1250 | 6.15 | 6.60 | 0.83 |
| | 15F | 0 | 820 | 735 | 42.06 | 60.60 | 154 | 180 | 1180 | 1170 | 6.40 | 5.79 | 0.83 |
| 85 g/m² Meltblown as in 15A-E | 16A | 20 | 400 | 408 | 42.94 | 55.47 | 73.9 | 90.2 | 704 | 704 | 4.50 | 4.37 | 0.59 |
| | Water Capacity (g/g) = 5.25, Change % = 34%, Effective Water Capacity (g/g) = 1.93 and Change % = 115% | | | | | | | | | | | | | |
| | 16B | 40 | 358 | 340 | 35.39 | 60.02 | 48.8 | 77.4 | 690 | 640 | 4.60 | 3.91 | 0.69 |
| | 16C | 0 | 433 | 425 | 49.39 | 51.31 | 96.9 | 91.5 | 640 | 840 | 6.09 | 5.33 | 0.58 |
| | Water Capacity (g/g) = 3.92, Change % = 34%, Effective Water Capacity (g/g) = 0.66 and Change % = 115% | | | | | | | | | | | | | |
| | 16D | 0 | 425 | 425 | 45.54 | 55.00 | 86.2 | 100 | 680 | 740 | 5.03 | 4.83 | 0.53 |
| 109 g/m² Meltblown Polypropylene With Weave Bond Pattern of % Bond Coverage of bonds/in² | 17A | 20 | 528 | 483 | 36.18 | 55.31 | 80.3 | 108 | 880 | 850 | 5.87 | 5.41 | 0.94 |
| | Water Capacity (g/g) = 6.58, Change % = 45%, Effective Water Capacity (g/g) = 2.93 and Change % = 124% | | | | | | | | | | | | | |
| | 17B | 20 | 403 | 368 | 33.19 | 53.03 | 54.7 | 75.2 | 840 | 780 | 5.16 | 5.11 | 0.99 |
| | 17C | 0 | 543 | 523 | 40.72 | 49.05 | 103 | 111 | 920 | 950 | 7.44 | 6.27 | 0.97 |
| | Water Capacity (g/g) = 4.54, Change % = 45%, Effective Water Capacity (g/g) = 1.31 and Change % = 124% | | | | | | | | | | | | | |
| 17 g/m² Spunbonded Polypropy- | 18A | 20 | 915 | 1008 | 39.25 | 42.65 | 157 | 175 | 2630 | 3140 | 5.94 | 5.66 | 0.50 |
| | Water Capacity (g/g) = 5.55, Change % = 39%, Effective Water Capacity = 1.51 and Change % = 115% | | | | | | | | | | | | | |
| | 18B | 0 | 935 | 1248 | 41.22 | 45.33 | 171 | 242 | 2510 | 3090 | 6.76 | 5.61 | 0.34 |

TABLE IV-continued

| Example | 15.2 % Stretch | Grab Tensile (g/cm) MD | CD | Elongation (%) MD | CD | Energy (dyne-cm × 10⁵) MD | CD | Trap Tear (g) MD | CD | Drape Flex (cm) MD | CD | Bulk (mm.) |
|---|---|---|---|---|---|---|---|---|---|---|---|---|
| lene on Each Side of 20.5 g/m² Meltblown Polypropylene Bonded as in Example 15 | | | | | | | | | | | | |
| | | Water Capacity (g/g) = 3.99, Change % = 39%, Effective Water Capacity = 0.70 and Change % = 115% | | | | | | | | | | |
| | 19A | 20 | 1185 | 1335 | 40.44 | 55.95 | 205 | 314 | 3140 | 4090 | 7.49 | 6.48 | 0.69 |
| | 19B | 0 | 1393 | 1465 | 43.71 | 49.76 | 280 | 329 | 3390 | 4170 | 8.41 | 7.72 | 0.53 |
| 68 g/m² Spunbonded Polypropylene | 20A | 20 | 1000 | 1203 | 33.87 | 36.22 | 142 | 181 | 2630 | 3320 | 6.88 | 7.29 | 0.50 |
| | | Water Capacity (g/g) = 4.05, Change % = 42%, Effective Water Capacity = 0.71 and Change % = 92% | | | | | | | | | | |
| | 20B | 0 | 1210 | 1483 | 39.12 | 38.88 | 218 | 260 | 2830 | 3380 | 7.49 | 7.92 | 0.36 |
| | | Water Capacity (g/g) = 2.86, Change % = 42%, Effective Water Capacity = 0.37 and Change % = 92% | | | | | | | | | | |
| * | 21A | 6.25 | 455 | 398 | 14.67 | 26.26 | 29.8 | 43.8 | 460 | 370 | 9.25 | 7.70 | 1.41 |
| * | 21B | 0 | 460 | 395 | 15.30 | 23.20 | 34.0 | 39.4 | 420 | 360 | 9.25 | 8.99 | 1.51 |

*71 g/m² of meltblown polypropylene including 40% woodpulp as in U.S. Pat. No. 4,100,324 to Anderson et al issued 11 July 1978 bonded to each side of 17 g/m² polypropylene spunbonded in Example 20.

Samples prepared in accordance with Example 17 tested for total capacity and effective capacity as a measure of squeeze out properties. The stretched 109 g/m² meltblown web bonded as in Example 17 showed an improvement of from 4.08 to 6.27 g/g (54%) in total capacity and from 1.86 to 3.94 g/g (112%) in effective capacity while 79 g/m² meltblown material bonded as in Example 17 showed an improvement of from 4.69 to 6.08 g/g (30%) in total capacity and from 2.45 to 3.95 g/g (61%) in effective capacity. Webs in accordance with the invention thus demonstrate highly significant improvements in effective capacity of at least about 35%, preferably at least about 50% and, most preferably at least about 90% when compared with unstretched webs.

EXAMPLE 22

For comparison of different basis weight webs, meltblown materials made as in Example 1 and having varying weights were stretched in accordance with the invention between a pair of rubber nip rolls and a pair of steel geared nip rolls with a draw ratio of 20%. The nips were separated by about 5 inches, and the 85 g/m² (originally 16.5 inches in width) and the 65 g/m² (originally 23 inches in width) webs were folded to about 13 inches prior to stretching. Table V provides results of testing these webs and demonstrates the improvements in softness (Handle-O-Meter), bulk, and absorbency at the full range of weights.

web segments 24 comprise bond areas 36 of fused thermoplastic material between which are stretched and loopy filaments 38. As shown, the fibers extend out of the bond plane of the fabric and result in a lofty and bulky web. By contrast, the fused areas 36 are flat and essentially in the plane of the nonwoven fabric.

FIG. 3 is a similar illustration of a laminate embodiment wherein the web of FIG. 2 is combined with layer 40.

FIGS. 4 and 5 are cross-sectional views of the materials of FIGS. 2 and 3 taken along line 4—4 and 5—5, respectively.

Figure 7:
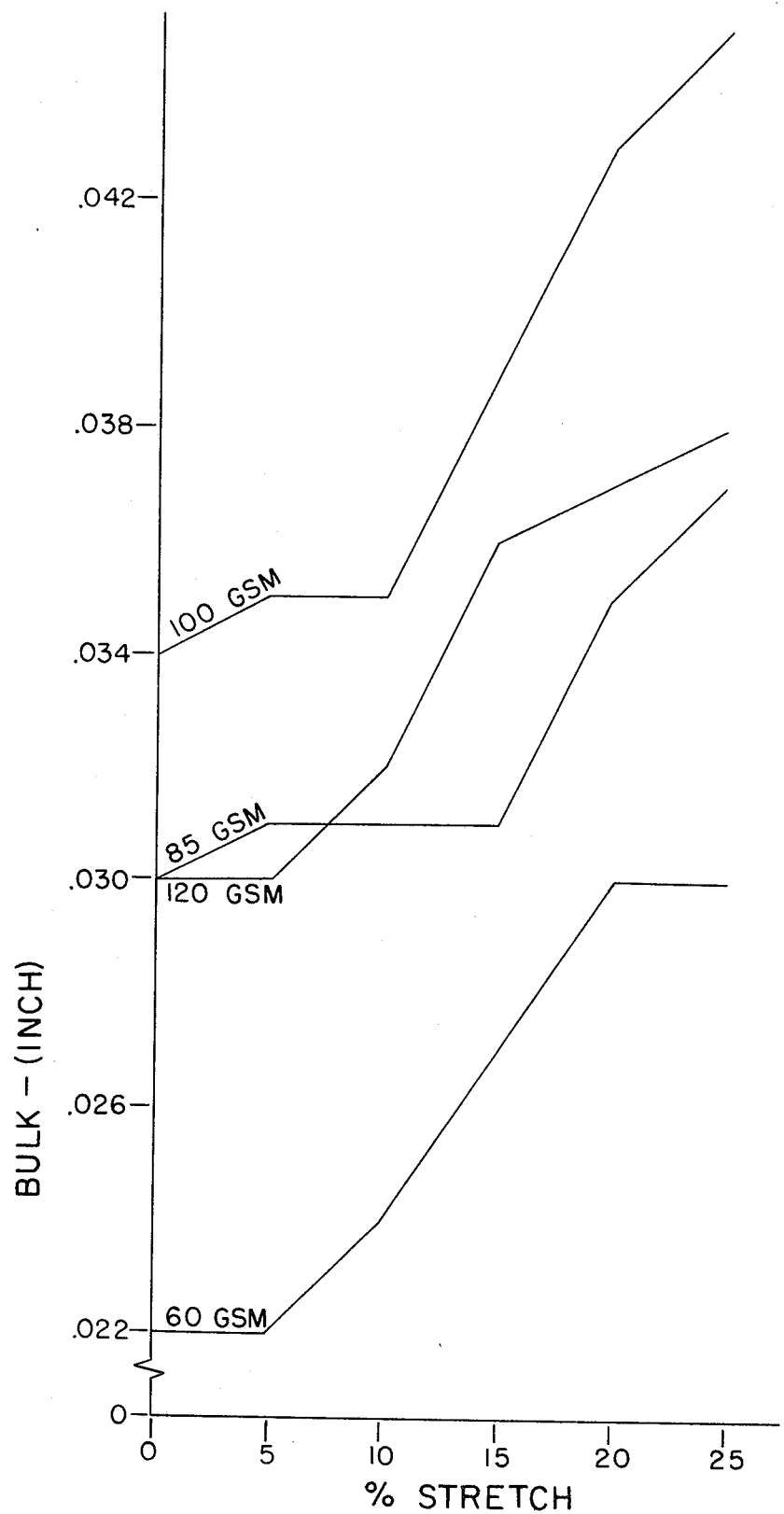
FIG. 7 is a graph illustrating improvements in bulk obtained in accordance with the invention.

Turning to FIG. 6 the results are illustrated in graphic form with respect to improvements in drape as measured by standard Handle-O-Meter tests. As shown, in an 85 grams/square meter basis weight web of meltblown polypropylene microfibers, and drape decreases quite rapidly in a range of from about 5 to 15% stretch and then more gradually thereafter. Turning to FIG. 7, the improvement in bulk is graphically illustrated. As shown, a very dramatic improvement is obtained within the range of from 5 to 20% stretch.

The limited stretching in accordance with the invention produces a soft, drapable, bulky web while retaining to a high degree the desired strength properties from pattern bonding. The conditions for stretching in accordance with the invention are important but may be varied within considerable ranges. For example, the temperature conditions for stretching should be below

TABLE V

| Example 22 | | 120 GSM Unsoft. | Soft | Δ Ave. % | 85 GSM Unsoft. | Soft | Δ Ave. % | 60 GSM Unsoft. | Soft | Δ Ave. % |
|---|---|---|---|---|---|---|---|---|---|---|
| Size (cm.) | MD | — | 12.24 | — | — | 12.01 | — | — | 12.30 | — |
| | CD | 33.8 | 33.0 | −2.1 | 42.6 | 42.0 | −1.4 | 61.7 | 61.1 | −1.0 |
| Basis Weight (g/m²) | | 113.8 | 104.1 | −8.5 | 78.7 | 82.9 | +5.3 | 56.2 | 55.2 | −1.8 |
| Bulk (mm.) | | 1.01 | 1.07 | +6.6 | 0.64 | 0.79 | +24.4 | 0.54 | 0.56 | +3.8 |
| Grab Tensile (grams) | MD | 8112 | 6504 | −19.8 | 5164 | 4568 | −11.5 | 3358 | 2861 | −14.8 |
| | CD | 7690 | 5919 | −23.0 | 4505 | 4066 | −9.8 | 3148 | 2666 | −15.3 |
| Elongation (%) | MD | 47.7 | 37.8 | −20.8 | 39.9 | 33.7 | −15.5 | 41.4 | 35.4 | −14.5 |
| | CD | 57.4 | 60.7 | +5.8 | 47.1 | 49.9 | +5.9 | 51.3 | 51.5 | +0.4 |
| Energy (%) (dyne-cm × 10⁵) | MD | 181 | 114 | −37.3 | 94 | 73 | −23.2 | 31 | 48 | −23.8 |
| | CD | 191 | 180 | −20.7 | 90 | 89 | −1.1 | 67 | 61 | −8.3 |
| Trap Tear (grams) | MD | 1293 | 1307 | +1.1 | 731 | 775 | +6.0 | 548 | 583 | +6.4 |
| | CD | 1281 | 1321 | +3.1 | 643 | 768 | +19.4 | 531 | 634 | +19.4 |
| Handle-O-Meter (grams) | MD | 34.1 | 11.7 | −65.7 | 13.4 | 8.4 | −37.3 | 5.4 | 4.2 | −22.2 |
| | CD | 25.5 | 10.8 | −57.6 | 8.8 | 7.6 | −13.6 | 4.1 | 3.9 | −4.9 |
| Absorbent Capacity (g water/g fiber) | | 7.51 | 9.52 | +26.8 | 7.48 | 8.94 | +19.5 | 9.73 | 11.40 | +17.2 |

Turning now to FIG. 2, the web of the present invention will be characterized in further detail. As shown, the melt softening point of the polymer and, preferably, room temperature, or 50° F. to 100° F. The degree of stretch must not be so great as to break the filaments but must be sufficient to provide stretch beyond into a straightened configuration so that, when relaxed, the filaments will retain at least some of the increase in length between the bond areas. This stretching is preferably in the range producing a dimension of up to 140% or an increase of up to 40% of the original dimension. It will be understood by those skilled in the art that the direction of stretch may be varied and, if desired, can be performed in more than one direction. Similarly, progressive stretching or repetitive stretching steps may be employed.

Figure 8:
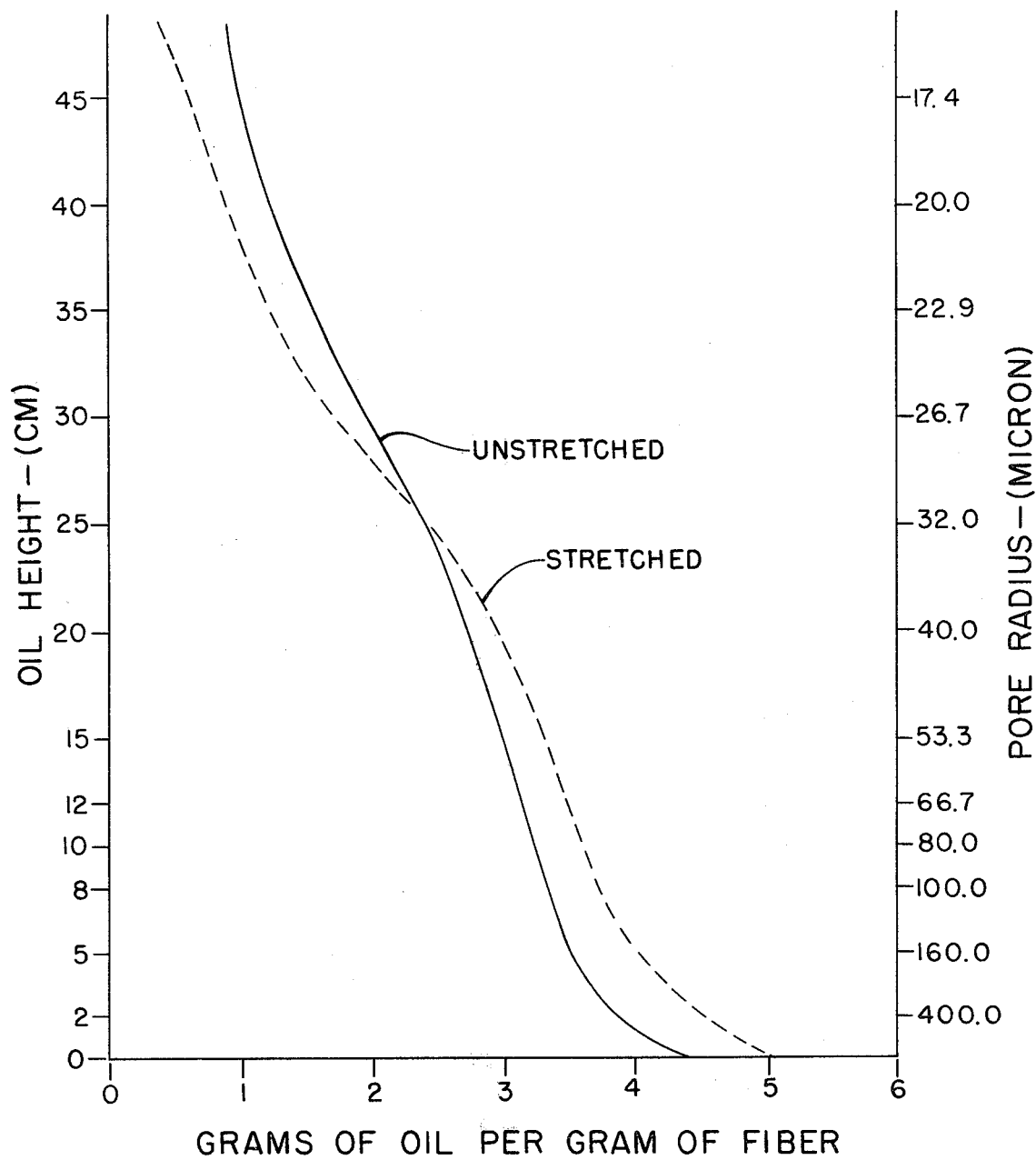
FIG. 8 is a capillary suction pressure graph illustrating pore size distribution of a web produced in accordance with the present invention.

Turning to FIG. 8, it can be seen that webs softened in accordance with the invention contain an increased number of larger size pores (for example, 40 microns or greater) while the number of smaller diameter pores is somewhat reduced. The solid line represents 109.0 g/m$^2$ meltblown polypropylene pattern bonded microfiber web while the broken line represents the same material softened by stretching 19% in accordance with this invention. The capillary suction tests were carried out as described in the above-identified Meitner U.S. Pat. No. 4,307,143. The loss of the small pore volume has a minimal adverse effect on oil wiping properties while the increase in large pore volume significantly improves water wiping properties. Accordingly, preferred embodiments of the present invention for wiping purposes are meltblown microfiber webs having a capacity of pores in excess of 40 microns in diameter of at least equal to that of unstretched material and preferably, at least about 5% greater. The webs of the present invention have an increase in pores in excess of 40 microns in diameter of at least about 10% at about zero pressure and, preferably at least about 15% when compared with unstretched webs.

Further, in accordance with the invention, it is important that the stretching step be carried out under cool or ambient temperatures less than the melt softening point of the polymer. In addition, it is essential that the web be allowed to relax for at least about 0.25 second under zero or low (for example, less than 2% additional stretch) tension after stretching to allow the filament looping to take place. Stretching may take place in steps, however, with relaxation between increments or after stretching is complete. Without such precautions, the full benefits of the invention will not be attained.

Figure 9:
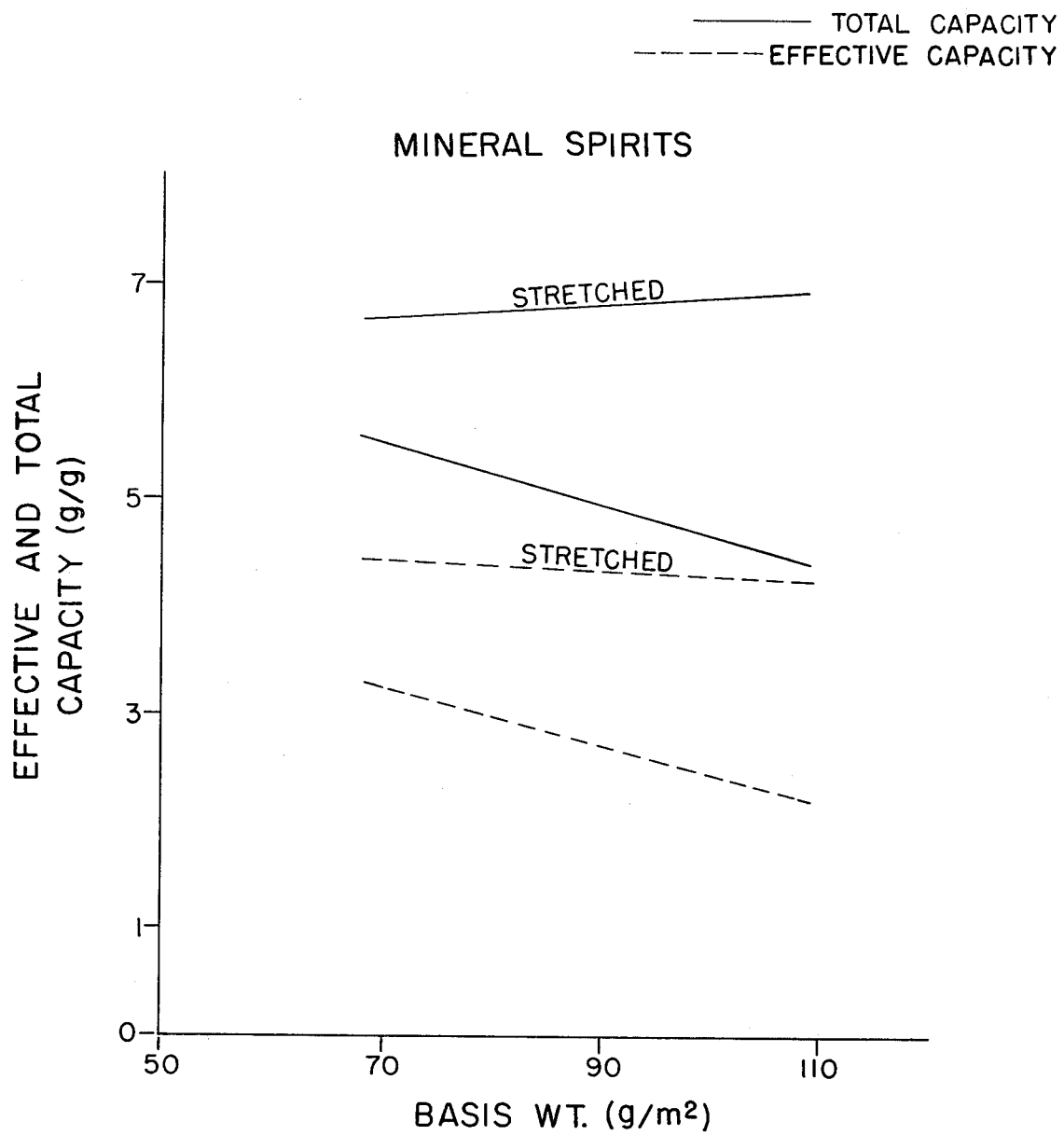
FIG. 9 is a graph illustrating the effect of the invention on oil capacity.
Figure 10:
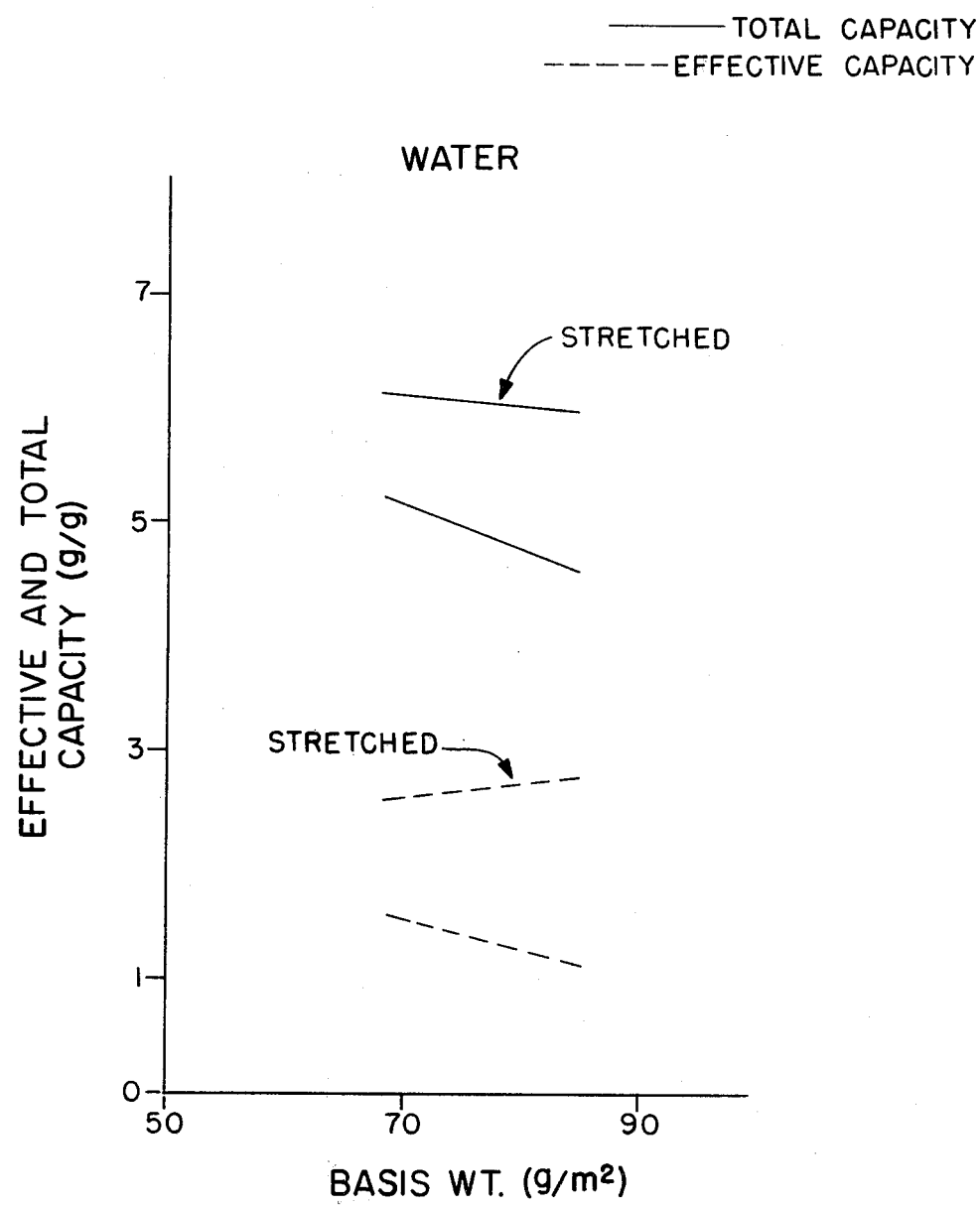
FIG. 10 is a graph illustrating the effect of the invention on water capacity.

Turning to FIGS. 9 and 10, it can be seen that softened webs in accordance with the invention demonstrate much improved effective capacity and even substantially reverse the tendency of such materials to exhibit reduced capacity at higher basis weight. This result is especially significant for wiping applications. The improvement in effective capacity is at least 35% and, preferably at least 50%.

The materials of the invention may be treated for certain properties by the addition of wetting agents and the like. However, such additives must not materially interfere with the filaments or fiber interbonding so as to prevent forming the extended fibers or filaments between bonds. Thus, inclusion of other than minor amounts of fibers such as wood pulp or higher melting polymers than the main component is to be avoided.

Pattern bonding of the web or laminate prior to stretching may be by conventional means such as passing through a rotating patterned nip, ultrasonic bonding against a patterned anvil and the like. The pattern may vary widely as long as the average distance between bonds is less than the average fiber or filament length and the average bond area percent is in the range of about 9% to 35% for drape and flexibility—density 30 pins/in$^2$—200. For line patterns, the density will be different although the percent bond area will be in the above range.

The polymers useful in accordance with the invention include any thermoplastic polymer material capable of forming nonwoven webs. These are, for example, and without lamination, polypropylene, polyethylene, polyester, polyamides, copolyesters and mixtures or blends thereof.

Thus it is apparent that there has been provided, in accordance with the invention, an improved nonwoven material that fully satisfies the objects, aims and advantages set forth above. While the invention has been described in connection with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. Nonwoven web comprising thermoplastic staple length or longer fibers or filaments containing a pattern of fused bond areas over about 9 to 35% of the web surface separated by areas of substantially unbonded fibers or filaments extending out of the plane of the fused bonds wherein said web is extended to up to about 140% of its original dimension in at least one direction resulting in increased bulk and improved softness and an improvement in effective capacity of at least 35% with an increase in pores in excess of 40 microns of at least about 10% when compared with the unextended web.

2. The web of claim 1 wherein said thermoplastic is polypropylene.

3. The web of claim 1 wherein said thermoplastic is selected from the group consisting of polypropylene, polyethlene, polyesters, copolyesters, polyamides and blends of any of these.

4. The web of claims 1 or 2 wherein said fibers or filaments are microfibers having an average diameter of less than about 10 microns.

5. The web of claim 1 comprising a laminate containing a plurality of layers of thermoplastic fibers or filaments.

6. The web of claim 5 wherein the laminate comprises at least one spunbonded layer and at least one microfiber layer having an average fiber diameter of less than about 10 microns.

7. The web of claim 6 wherein the thermoplastic in said layers is polypropylene.

8. The web of claim 1 wherein the increase in pores in excess of 40 microns is at least about 15% and the effective capacity of these pores is at least 50% greater when compared with unextended webs.

9. The web of claim 1 or 8 wherein the bond density is in the range of from about 30 to 200 pins/in$^2$.

10. A wiper formed from the web of claim 4.

11. Method of improving properties of a nonwoven web comprising the steps of,
   (a) providing a nonwoven web of thermoplastic staple length or longer fibers or filaments containing a pattern of fused bond areas over about 9 to 35% of the web surface and interbonded fibers or filaments between said fused bond areas, (b) stretching said web at a temperature below the melt softening point of the thermoplastic up to about 140% of the original web dimension and less than the breaking point of the fibers or filaments in at least one direction breaking said interfiber or interfilament bonds by straightening said fibers or filaments while substantially maintaining said fused bonds, and (c) allowing said fabric to relax under low or no tension for at least about 0.25 second.

12. The method of claim 11 wherein said thermoplastic is polypropylene.

13. The method of claims 11 or 12 wherein said fibers or filaments are microfibers having an average diameter of less than about 10 microns.

14. The method of claim 11 wherein said web comprises a laminate containing a plurality of layers of thermoplastic fibers or filaments.

15. The method of claim 14 wherein the laminate comprises at least one spunbonded layer and at least one microfiber layer having an average diameter of less than about 10 microns.

16. The method of claim 15 wherein the thermoplastic in said layers is polypropylene.

17. The method of claim 11 wherein said stretching increases the fluid capacity of pores in excess of 40 microns by at least about 10% when compared with the unstretched web.

18. The method of claim 11 including a repetition of the stretching and relaxing steps.

19. The method of claim 11 including stretching by increments prior to relaxation.

20. The method of claim 11 wherein the thermoplastic is selected from the group consisting of polypropylene, polyethylene, polyesters, copolyesters, polyamides and blends of any of these.

* * * * *

UNITED STATES PATENT AND TRADEMARK OFFICE
CERTIFICATE OF CORRECTION

PATENT NO.   :   4,443,513
DATED        :   April 17, 1984
INVENTOR(S)  :   Gary H. Meitner, Patrick J. Notheis It is certified that error appears in the above—identified patent and that said Letters Patent is hereby corrected as shown below:

Col. 7, TABLE IV, in the second column heading, delete "15.2".

Col. 7, TABLE IV, in the description in the first column for example 17A-C, for "Pattern of % Bond" read -- Pattern of 15.2% Bond --.

Col. 10, line 34, for "85", read -- 120 --.

Signed and Sealed this

Sixteenth Day of April 1985

[SEAL]

Attest:

DONALD J. QUIGG

Attesting Officer  Acting Commissioner of Patents and Trademarks